G. E. RIGBY.
ADJUSTING MEANS FOR THE DRIVING BELTS OR CHAINS OF MOTOR CYCLES AND THE LIKE.
APPLICATION FILED MAR. 1, 1917.

1,252,952.

Patented Jan. 8, 1918.
2 SHEETS—SHEET 1.

WITNESSES.

INVENTOR.
George E. Rigby

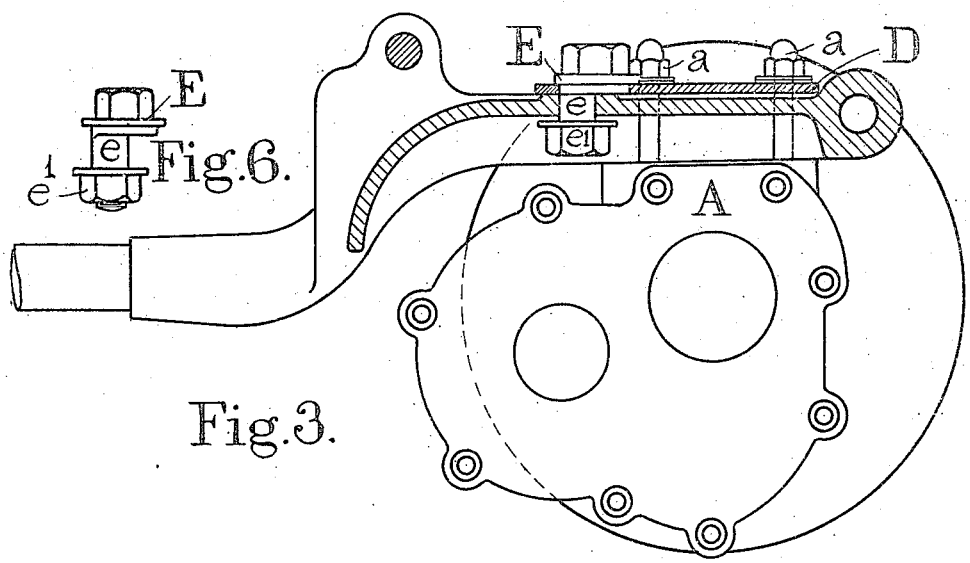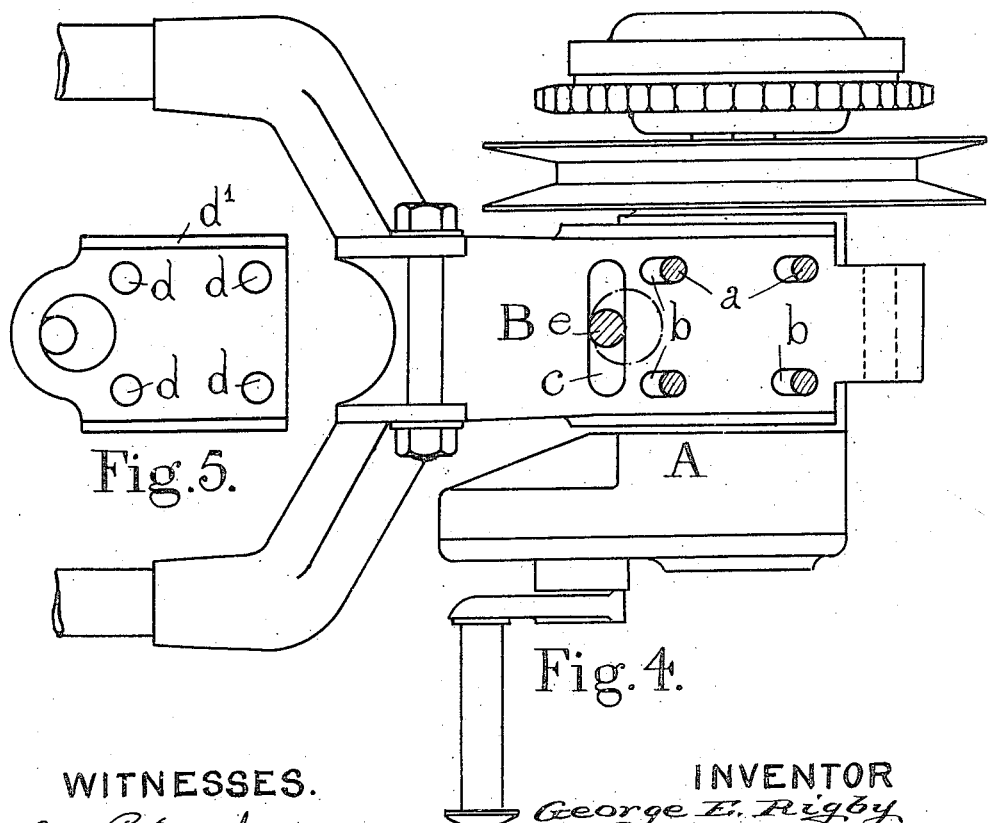

UNITED STATES PATENT OFFICE.

GEORGE E. RIGBY, OF MANCHESTER, ENGLAND.

ADJUSTING MEANS FOR THE DRIVING BELTS OR CHAINS OF MOTOR-CYCLES AND THE LIKE.

1,252,952.

Specification of Letters Patent.  Patented Jan. 8, 1918.

Application filed March 1, 1917.  Serial No. 151,746.

*To all whom it may concern:*

Be it known that I, GEORGE EDWIN RIGBY, a British subject, residing at Manchester, county of Lancaster, England, have invented certain new and useful Improvements in Adjusting Means for the Driving Belts or Chains of Motor-Cycles and the like, of which the following is a specification.

This invention relates to the adjusting of the driving belt or chain of motor cycles and the like, and is designed to provide for the ready adjustment of the same to tighten or take up any slackness, or vary the tension of the same between the motor and gear box.

It consists essentially in applying to the counter shaft gear bracket to which the gear box is bolted an adjustment plate or bracket fitted with an eccentric, cam or similar device by which the position of the gear box relative to the bracket can be readily adjusted.

The invention will be fully described with reference to the accompanying drawings.

Figure 1:
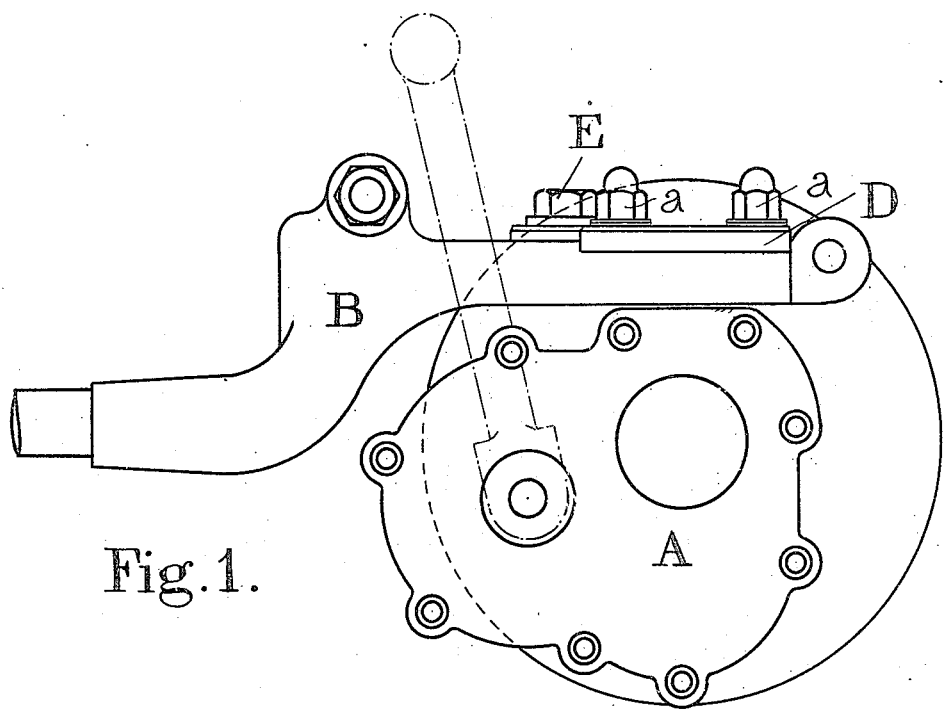

Figure 1. Side elevation of counter shaft gear bracket B and gear box A.

Figure 2:
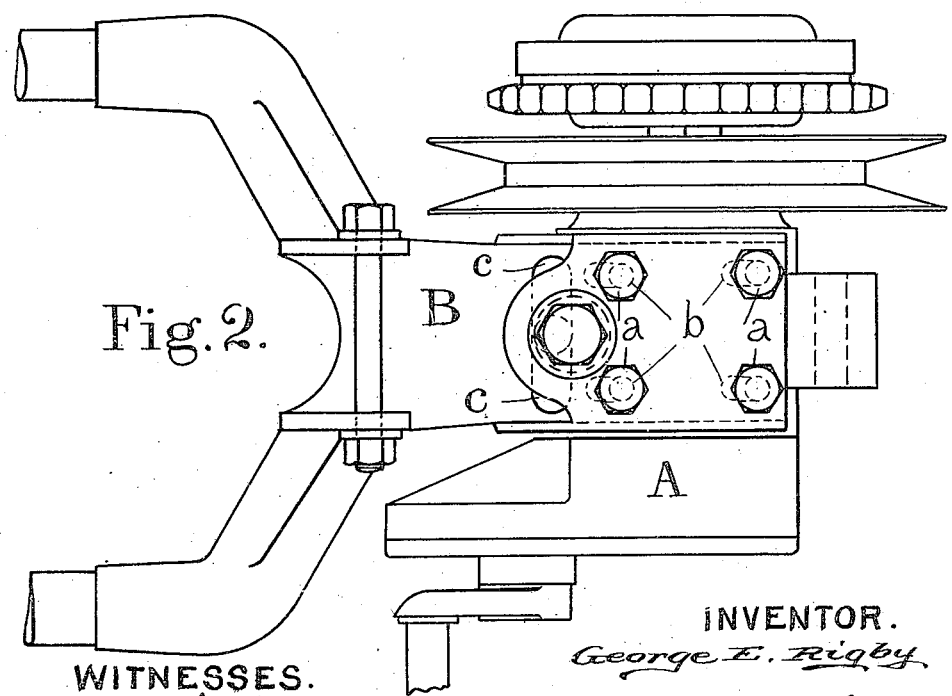

Fig. 2. Plan of same.

Fig. 3. Side elevation of the gear box A and longitudinal section through the gear bracket B.

Fig. 4. Plan of the counter shaft gear bracket B.

Fig. 5. Plan from underside of the adjustment plate D.

Fig. 6. Elevation of eccentric stud E.

The counter shaft gear box A is of any known construction and the counter shaft gear bracket B is mounted or fitted to the frame of the cycle in any ordinary manner the gear box A being secured in position to the gear bracket B in the ordinary way by studs or bolts $a$ fitting into slots $b$.

In the gear bracket B in addition to the slots $b$ for the bolts $a$ a transverse slot C is formed to receive the end of an eccentric stud or its equivalent.

To the top of the gear bracket B an adjustment plate or bracket D is fitted capable of sliding to and fro thereon longitudinally.

In this adjustment plate D holes $d$ are formed of a size to fit over the bolts $a$ with little or no play and through which the securing bolts $a$ of the gear box A project. In the adjustment plate D a circular hole is formed and in it is fitted an eccentric stud or pin E the lower member $e$ of which projects downward into the transverse slot C in the gear bracket and is secured in position therein by a nut $e'$ on the under side or by a pin or cotter. The upper end of the eccentric stud E is provided with a square, hexagonal or other head to be engaged by a spanner or tool to rotate it. By rotating the eccentric stud E the adjustment plate D will be caused to slide to and fro longitudinally of the gear bracket B. The adjustment plate is preferably formed with side flanges $d'$ to prevent lateral movement.

The position of the eccentric stud E may be reversed with a circular bearing in the gear bracket and a slot in the adjustment plate D.

Instead of an eccentric stud any other form of eccentric or crank device may be applied to the adjustment plate to move it relatively to the gear bracket.

It will be obvious that the eccentric stud may be fitted to rotate in the gear bracket and the eccentric member fit into a transverse slot or groove in the top of the gear box or in a plate similar to D affixed thereto but at present I prefer the construction shown.

The gear box A is attached to the gear bracket B in the usual way by the bolts $a$ projecting through the slots $b$, the slots $b$ allowing of movement of the bolts therein to adjust the position of the gear box upon the gear bracket. The adjustment plate D is fitted in position on the top of the gear bracket B with the holes $d$ over the slots $b$ and the end $e$ of the eccentric stud E projecting through the slot C. The bolts then project through the holes $d$ the latter being of the same size as the bolts $a$ and the gear box is finally secured in position by the nuts on the ends of the bolts $a$.

The gear bracket B being rigidly attached to the frame, by rotating the eccentric stud E the adjustment plate D is moved to and fro thereon and by reason of the bolts $a$ projecting through it the position of the gear box A is simultaneously moved to adjust the tension of the driving chain or belt.

What I claim as my invention and desire to protect by Letters Patent is:—

1. The combination with the gear box and gear bracket of a motor-cycle of a sliding adjustment plate fitted to the gear bracket with holes through which the screw studs for attaching the gear box pass and an eccentric or eccentric stud mounted in the plate and in the top of the gear box by which the plate and the gear box are moved relative to the gear bracket to adjust the tension of the driving belt or chain substantially as described.

2. In a counter shaft gear for motorcycles the combination with the counter shaft gear box and gear bracket of a sliding adjustment plate fitted on the gear bracket and an eccentric fitted thereto by which the plate is moved relatively to the bracket substantially as described.

3. In a counter shaft gear for motorcycles the combination with the counter shaft gear box and gear bracket of a sliding adjustment plate fitted on the gear bracket and provided with bolt holes, bolts attached to the gear box and passing through the bracket, and an eccentric engaging both the bracket and the plate whereby the latter may be moved relative to the former to adjust the position of the gear box on the gear bracket substantially as described.

In testimony whereof I have hereunto set my hand in presence of two subscribing witnesses.

GEO. E. RIGBY.

Witnesses:
J. OWDEN O'BRIEN,
GEO. H. O'BRIEN.

Copies of this patent may be obtained for five cents each, by addressing the "Commissioner of Patents, Washington, D. C."